US007427318B2

(12) United States Patent
Davies-Smith et al.

(10) Patent No.: US 7,427,318 B2
(45) Date of Patent: Sep. 23, 2008

(54) HIGHLIGHTABLE AND HIGHLIGHTED MIXTURES, MARKING INSTRUMENTS, AND METHODS OF USING THE SAME

(75) Inventors: Leighton Davies-Smith, Oswego, IL (US); Vincent Wing Sum, Deerfield, IL (US)

(73) Assignee: Sanford, L.P., Oak Brook, IL (US)

( * ) Notice: Subject to any disclaimer, the term of this patent is extended or adjusted under 35 U.S.C. 154(b) by 564 days.

(21) Appl. No.: 10/956,584

(22) Filed: Oct. 1, 2004

(65) Prior Publication Data

US 2005/0120919 A1     Jun. 9, 2005

Related U.S. Application Data

(63) Continuation-in-part of application No. 10/680,362, filed on Oct. 7, 2003, now Pat. No. 7,083,665.

(51) Int. Cl.
  *C09D 11/00* (2006.01)
(52) U.S. Cl. .............. 106/31.32; 106/31.28; 106/31.64; 106/31.58
(58) Field of Classification Search .............. 106/31.32, 106/31.64, 31.58
  See application file for complete search history.

(56) References Cited

U.S. PATENT DOCUMENTS

| | | | |
|---|---|---|---|
| 2,029,152 A | 1/1936 | Bonkowski | 120/36 |
| 3,875,105 A | 4/1975 | Daugherty et al. | 260/33.2 R |
| 3,886,083 A | 5/1975 | Laxer | 252/301.16 |
| 3,941,488 A | 3/1976 | Maxwell | 401/17 |
| 3,945,837 A | 3/1976 | Miyata et al. | 106/31.43 |
| 3,985,455 A | 10/1976 | Wahlberg | 401/30 |
| 4,029,506 A | 6/1977 | Dessauer | 430/332 |
| 4,148,591 A | 4/1979 | Tomura | 401/32 |
| 4,156,657 A | 5/1979 | Lin | 252/188.3 R |
| 4,213,717 A | 7/1980 | Lin | 401/18 |
| 4,227,930 A | 10/1980 | Lin | 106/19 |
| 4,228,028 A | 10/1980 | Lin | 252/188.3 R |
| 4,252,845 A | 2/1981 | Griffiths et al. | 427/273 |
| 4,349,639 A | 9/1982 | Muller | 523/161 |
| 4,413,266 A | 11/1983 | Aviram et al. | 346/21 |
| 4,509,875 A | 4/1985 | Shintani | 401/34 |
| 4,557,618 A | 12/1985 | Iwata et al. | 401/34 |
| 4,580,918 A | 4/1986 | Baker et al. | 401/29 |
| 4,681,471 A | 7/1987 | Hayduchok et al. | 401/34 |
| 4,738,725 A | 4/1988 | Daugherty et al. | 106/308 M |
| 4,777,510 A | 10/1988 | Russel | 355/7 |
| 4,808,227 A | 2/1989 | Yuasa et al. | 106/31 |
| 4,865,479 A | 9/1989 | Doll | 401/17 |
| 4,971,628 A | 11/1990 | Loftin | 524/43 |
| 5,006,171 A | 4/1991 | Mecke et al. | 106/21 |
| 5,026,189 A | 6/1991 | Keil | 401/29 |
| 5,033,895 A | 7/1991 | Aida | 401/131 |
| 5,048,992 A | 9/1991 | Loftin | 401/209 |
| 5,053,339 A | 10/1991 | Patel | 436/2 |
| 5,139,572 A | 8/1992 | Kawashima | 106/21 |
| 5,215,956 A | 6/1993 | Kawashima | 503/201 |
| 5,232,494 A | 8/1993 | Miller | 106/22 |
| 5,256,191 A | 10/1993 | Thompson et al. | 106/19 |
| 5,326,388 A | 7/1994 | Miller et al. | 106/22 B |
| 5,338,123 A | 8/1994 | Obersteller et al. | 401/34 |
| 5,370,471 A | 12/1994 | Kageyama et al. | 401/52 |
| 5,378,752 A | 1/1995 | White et al. | 524/418 |
| 5,417,748 A | 5/1995 | Kawashima | 106/27 A |
| 5,427,278 A | 6/1995 | Gardner, III | 222/129 |
| 5,460,647 A | 10/1995 | Snedeker et al. | 523/161 |
| 5,464,470 A | 11/1995 | Brachman et al. | 106/22 |
| 5,478,382 A | 12/1995 | Miller et al. | 106/22 |
| 5,486,228 A | 1/1996 | Miller et al. | 106/22 |
| 5,489,331 A | 2/1996 | Miller et al. | 106/31.43 |
| 5,492,558 A | 2/1996 | Miller et al. | 106/22 |
| 5,498,282 A | 3/1996 | Miller et al. | 106/22 |
| 5,498,285 A | 3/1996 | Hooykaas | 106/486 |
| 5,499,881 A | 3/1996 | Chang | 401/17 |
| 5,509,742 A | 4/1996 | Balzarini | 401/17 |
| 5,549,742 A | 8/1996 | Cancellieri | |
| 5,593,459 A | 1/1997 | Gamblin | 8/539 |
| 5,649,999 A | 7/1997 | Wang | 106/31.32 |
| 5,762,077 A | 6/1998 | Griffiths | 132/74.5 |

(Continued)

FOREIGN PATENT DOCUMENTS

DE        27 24 820        12/1978

(Continued)

OTHER PUBLICATIONS

English translation of JP 2003-73602 A.*

(Continued)

*Primary Examiner*—Jerry Lorengo
*Assistant Examiner*—Veronica Faison Gee
(74) *Attorney, Agent, or Firm*—Marshall, Gerstein & Borun LLP (57) ABSTRACT

A highlightable mixture, such as an ink, including a colored pigment, an eradicable colorant, and a non-eradicable colorant; a kit including the highlightable mixture and an eradicator solution; colorant complex including a colorless or substantially colorless eradicable dye selected from the group consisting of diarylmethane derivatives, triarylmethane derivatives, and methine dyes, and a colored pigment; and methods of applying an eradicator to at least a portion of a marking made with a highlightable mixture, are described herein.

38 Claims, 1 Drawing Sheet

U.S. PATENT DOCUMENTS

| | | | |
|---|---|---|---|
| 5,785,746 A | 7/1998 | Kito et al. | 106/31.86 |
| 5,872,162 A | 2/1999 | McHugh et al. | 523/161 |
| 5,877,234 A | 3/1999 | Xu et al. | 523/161 |
| 5,916,357 A | 6/1999 | Wang et al. | 106/31.23 |
| 5,964,931 A | 10/1999 | Korper | 106/31.93 |
| 5,977,211 A | 11/1999 | Koyama | 523/161 |
| 5,988,807 A | 11/1999 | Bernard et al. | |
| 5,997,891 A | 12/1999 | Fuerst et al. | 424/401 |
| 6,037,391 A | 3/2000 | Iida | 523/161 |
| 6,048,914 A | 4/2000 | Goto et al. | 523/161 |
| 6,051,629 A | 4/2000 | Ichikawa et al. | 523/161 |
| 6,124,377 A | 9/2000 | Kaiser et al. | 523/161 |
| 6,149,721 A | 11/2000 | Wang et al. | 106/31.32 |
| 6,179,501 B1 | 1/2001 | Fulop | 401/34 |
| 6,203,603 B1 | 3/2001 | Takayama et al. | 106/31.16 |
| 6,214,766 B1 | 4/2001 | Kurrle | 503/201 |
| 6,221,432 B1 | 4/2001 | Wang et al. | 427/337 |
| 6,228,804 B1 | 5/2001 | Nakashima | 503/226 |
| 6,261,352 B1 | 7/2001 | Asami | 106/31.58 |
| 6,276,853 B1 | 8/2001 | Breidenbach et al. | 401/34 |
| 6,306,930 B1 | 10/2001 | Tsujio | 523/161 |
| 6,357,943 B1 | 3/2002 | Kuang | 401/17 |
| 6,406,204 B1 | 6/2002 | Omatsu et al. | 401/142 |
| 6,410,338 B1 | 6/2002 | Lippold et al. | 436/166 |
| 6,412,998 B1 | 7/2002 | Ham | 401/17 |
| 6,489,892 B2 | 12/2002 | Lawandy | 340/572.3 |
| 6,491,464 B1 | 12/2002 | Young | 401/35 |
| 6,503,317 B1 | 1/2003 | Ortalano et al. | 106/493 |
| 6,518,356 B1 | 2/2003 | Friese et al. | 524/580 |
| 6,554,516 B1 | 4/2003 | Christopher | 401/31 |
| 6,613,135 B1 | 9/2003 | Miyamoto et al. | 422/129 |
| 6,905,539 B2 * | 6/2005 | Patel et al. | 106/31.32 |
| 2001/0006610 A1 | 7/2001 | Miller et al. | 422/129 |
| 2002/0058296 A1 | 5/2002 | Miller et al. | 435/31 |
| 2002/0151084 A1 | 10/2002 | Lippold et al. | 436/163 |
| 2003/0082823 A1 | 5/2003 | Sumitani et al. | 436/136 |

FOREIGN PATENT DOCUMENTS

| | | |
|---|---|---|
| DE | 29 27 006 A1 | 1/1981 |
| DE | 199 03 248 A1 | 8/2000 |
| EP | 0 049 777 | 4/1982 |
| EP | 1 085 059 A1 | 3/2001 |
| EP | 1 523 887 A2 | 4/2005 |
| JP | 54-16235 | 2/1979 |
| JP | 60-190479 | 9/1985 |
| JP | 6049397 | 2/1994 |
| JP | 2001 158196 | 6/2001 |
| JP | 2001-247807 | 9/2001 |
| JP | 2003-73602 | 3/2003 |
| JP | 2003073602 A * | 3/2003 |
| WO | WO-2005/035673 A1 | 4/2005 |
| WO | WO-2006/068723 A1 | 6/2006 |

OTHER PUBLICATIONS

International Search Report for PCT/US04/33029, prepared by European Patent Office, bearing mail date Feb. 9, 2005, 4 pages.

Written Opinion of the International Searching Authority for PCT/US04/33029, prepared by the European Patent Office, mail date Feb. 9, 2005, 8 pages.

International Preliminary Report on Patentability for PCT/US2004/033029, dated Apr. 10, 2006.

* cited by examiner

FIGURE 1

HIGHLIGHTABLE AND HIGHLIGHTED MIXTURES, MARKING INSTRUMENTS, AND METHODS OF USING THE SAME

CROSS-REFERENCE To RELATED APPLICATION

This application is a continuation-in-part of application Ser. No. 10/680,362 filed Oct. 7, 2003 now U.S. Pat. No. 7,083,655.

BACKGROUND

1. Technical Field

The invention relates generally to color changing compositions.

2. Brief Description of Related Technology

Eradicable mixture systems, such as inks, generally include two components. One component is an aqueous mixture that includes a dye—typically a triarylmethane—that can be rendered substantially colorless when contacted with a substance such as a sulfite reducing agent, an amine, or other basic compounds such as hydroxides. The second component is an aqueous eradicator fluid that includes a complementary substance that can cause the dye to convert to a substantially colorless form. For example, a user writes with an eradicable ink and, if correction is necessary, applies the eradicator fluid to the ink marking to decolorize the dye.

Highlighting a marking is typically performed using a fluorescent ink applied over a regular marking made by an ink on a substrate (e.g., paper). A typical fluorescent highlighting ink has a translucent quality to allow for a user to apply the highlight ink and yet still see the regular ink marking under the fluorescent ink marking made by the marker. While this process serves to highlight a regular ink marking, it also has the undesirable effects, such as highlighting areas of the substrate that do not include a regular ink marking.

SUMMARY

One aspect of the disclosure is a composition including a pigment, an eradicable colorant, and a non-eradicable colorant.

Another aspect of the disclosure is a method of highlighting, the method including the steps of marking a substrate with a highlightable mixture described herein, and contacting the highlightable mixture with an eradicator solution.

Yet another aspect of the disclosure is a kit including a highlightable mixture described herein, and an eradicator.

Yet another aspect of the disclosure is a colorant complex, including an at least substantially colorless dye selected from the group consisting of diarylmethane derivatives, triarylmethane derivatives, methine dyes, and combinations thereof, a non-eradicable dye, and a colored pigment.

Further aspects and advantages of the invention will be apparent to those skilled in the art from a review of the following detailed description, taken in conjunction with the appended claims. While the mixture, method of using the mixture, the kit, and the complex are susceptible of embodiments in various forms, the description hereinafter includes specific embodiments of the invention with the understanding that the disclosure is illustrative, and is not intended to limit the inventions to the specific embodiments described herein.

DETAILED DESCRIPTION

Figure 1:
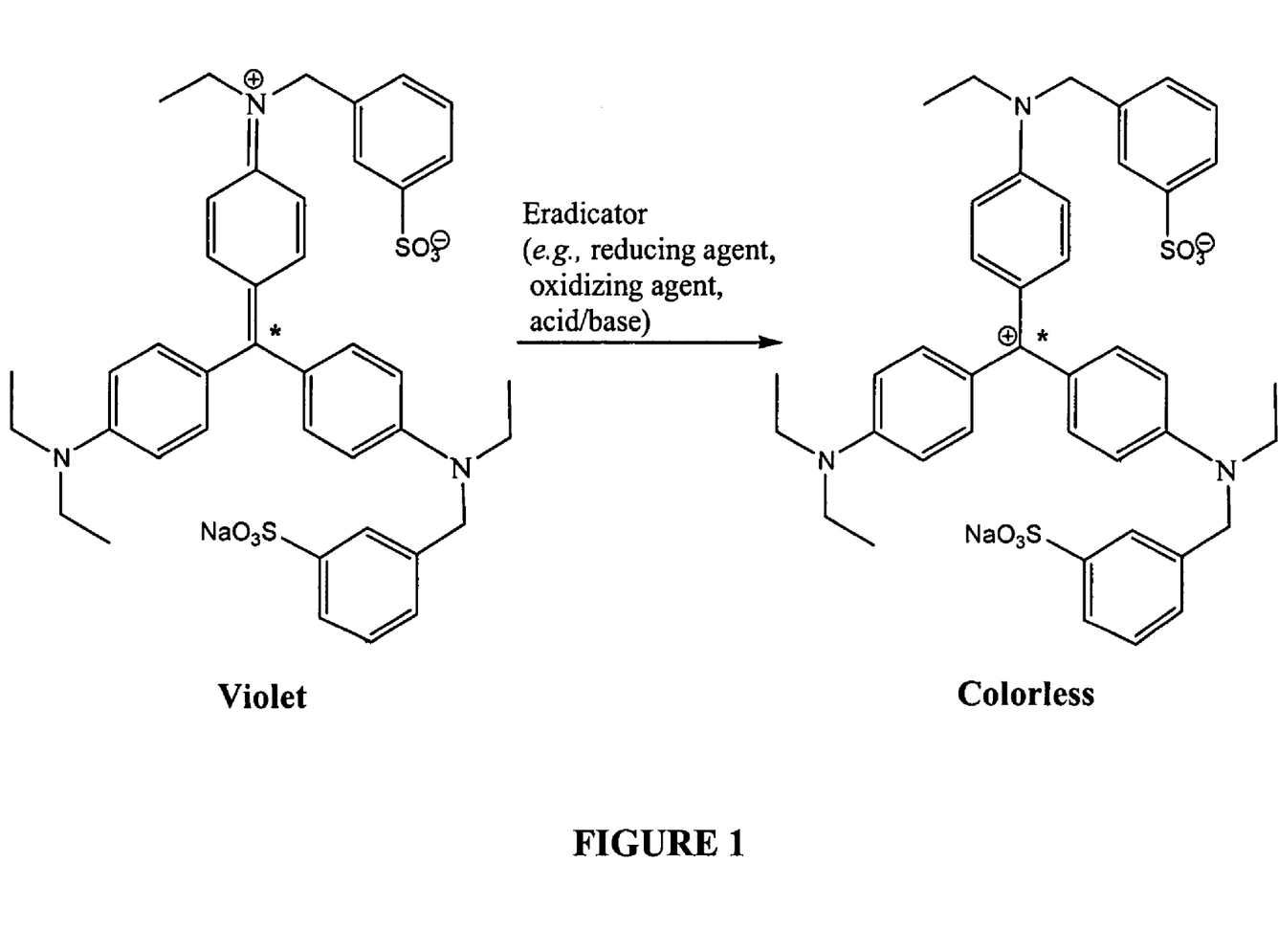
FIG. 1 is a reaction diagram illustrating a theoretical mechanism for the conversion of Acid Violet 17 from a violet colored compound to a substantially colorless (eradicated) compound.

The process of ink marking and eradication can proceed in two steps: the first is the marking of a substrate (e.g., paper) with an eradicable ink, and the second is the application of an eradication solution to the marking. A typical formulation for an eradicable ink includes a solvent (e.g., water) to dissolve a dye that is capable of being eradicated (e.g., a triarylmethane dye). The eradication solution includes an eradicator that, by a chemical process, converts a complementary colored dye into a substantially colorless compound or a color that matches that of the substrate (e.g., white for white paper). Such compounds include oxidizing agents, reducing agents, acid-base reactants, and chemicals that can sublime under the influence of heat. Without intending to be limited to any particular method of eradication, it is believed that for triarylmethane dyes, for example, the active colored dye is able to reflect color in the visible range (between 380 mn to 780 mn) because of the conjugation of the aromatic rings in the molecule; however, once a reducing agent (e.g., sodium sulfite) is applied to the triarylmethane dye, it destroys the conjugation by converting the $sp^2$ carbon center (shown in FIG. 1 with a *) to an $sp^3$ carbon by oxidizing that carbon center. Once this change in the hybridization takes place, the conjugation between the various rings of the dye molecule is lost and the dye molecule becomes colorless. This proposed process is shown in FIG. 1 for Acid-Violet 17.

The eradication solution preferably includes water or an organic solvent as the primary solvent, an eradicator such as a sulfite (e.g., sodium sulfite), bisulfite, or an amine (e.g., sodium glycinateior basic materials such as hydroxides) that can cause susceptible dyes to lose their colors (e.g., triarylmethane dyes) or to change color, and a film-forming polymer. A suitable eradicator solution for the inks described herein is a commercially available eradicator solution that includes both a sulfite and an amine as active eradicating agents (available from Sanford Reynolds of Valence, France). Preferably, the eradicator is a compound selected from the group consisting of a sulfite reducing agent (e.g., sodium sulfite), a bisulfite reducing agent (e.g., sodium bisulfite), and combinations thereof.

The highlightable nature of the ink is derived from the ability to convert the dye (chromophore) from a colored compound to at least substantially colorless, while not affecting the substantially-insoluble, colored pigment. As discussed above, this can be achieved with the combination of a colored pigment and a dye that is sensitive to an eradicator (i.e., an oxidizing agent, a reducing agent, an acid, a base, heat, etc.). Dyes which are capable of becoming at least substantially colorless upon the application of an eradicator include diarylmethane derivative dyes, triarylmethane derivative dyes, and methine derivative dyes. Diaryl dyes suitable for use with the inks described herein include Auramine O (Chemical Index No. 41000), and Basic Yellow 2 (Chemical Index No. 41000). In the colored state, the bi- and triarylmethane, and methine dyes often contain one or more cationic imine groups. The generic structure of a triarylmethane dye is shown below in formula (II):

(II)

wherein each R group is the same or different and preferably is selected from $C_1$ to $C_{10}$ alkyl groups. A non-exhaustive list of triarylmethane dyes for use in inks described herein are listed below in Table I.

TABLE I[1]

| Color Index Name | Color Index No. | Common/Commercial Name |
| --- | --- | --- |
| Acid Blue 22 | 42755 | Water Blue I |
| Acid Blue 93 | 42780 | Methyl Blue |
| Acid Fuchsin | 42685 | Acid Fuchsin |
| Acid Green | 42095 | Light Green Sf Yellowish |
| Acid Green 5 | 42095 | Light Green Sf Yellowish |
| Acid Magenta | 42685 | Acid Fuchsin |
| Acid Roseine | 42685 | Acid Fuchsin |
| Acid Rubin | 42685 | Acid Fuchsin |
| Acid Violet 17 | 42650 | Acid Violet 4BN |
| Acid Violet 19 | 42685 | Acid Fuchsin |
| Alizarol Cyanin R | 43820 | Eriochrome Cyanin R |
| Aluminon | 43810 | Triphenylmethane Chrome Violet Cg |
| Aniline Blue Ws |  | Aniline Blue Ws |
| Basic Blue 8 | 42563 | Victoria Blue 4r |
| Basic Blue 15 | 44085 | Night Blue |
| Basic Blue 20 | 42585 | Methyl Green |
| Basic Blue 26 | 44045 | Victoria Blue B |
| Basic Fuchsin |  | Basic Fuchsin |
| Basic Green 4 | 42000 | Malachite Green |
| Basic Red 9 | 42500 | Pararosanilin |
| Basic Red 14 | 48016 | Cationic Brilliant Red 5GN |
| Basic Violet 2 | 42520 | New Fuchsin |
| Basic Violet 3 | 42555 | Crystal Violet |
| Basic Violet 4 | 42600 | Ethyl Violet |
| Basic Violet 14 | 42510 | Rosanilin |
| Chrome Violet Cg | 43810 | Triphenylmethane Chrome Violet Cg |
| Chromoxane Cyanin R | 4382 | Eriochrome Cyanin R |
| Cotton Blue | 42780 | Methyl Blue |
| Crystal Violet | 42555 | Crystal Violet |
| Dahlia | 42530 | Hoffman's Violet |
| Diamond Green B | 42000 | Malachite Green |
| Eriochrome Cyanin R | 43820 | Eriochrome Cyanin R |
| Ethyl Green | 42590 | Ethyl Green |
| Ethyl Violet | 42600 | Ethyl Violet |
| Fast Green Fcf | 42053 | Fast Green Fcf |
| Food 3 | 42053 | Fast Green Fcf |
| Gentian Violet |  | Methyl Violet 2b |
| Helvetia Blue | 42780 | Methyl Blue |
| Hoffman's Violet | 42530 | Hoffman's Violet |
| Light Green | 42095 | Light Green Sf Yellowish |
| Lissamine Green Sf | 42095 | Light Green Sf Yellowish |
| Magenta 0 | 42500 | Pararosanilin |
| Magenta I | 42510 | Rosanilin |
| Magenta II |  | Magenta II |
| Magenta III | 42520 | New Fuchsin |
| Malachite Green | 42000 | Malachite Green |

TABLE I[1]-continued

| Color Index Name | Color Index No. | Common/Commercial Name |
| --- | --- | --- |
| Methyl Blue | 42780 | Methyl Blue |
| Methyl Green | 42585 | Methyl Green |
| Methyl Violet | 42535 | Methyl Violet 2b |
| Methyl Violet 2b | 42535 | Methyl Violet 2b |
| Methyl Violet 10b | 42555 | Crystal Violet |
| Mordant Blue 3 | 43820 | Eriochrome Cyanin R |
| Mordant Violet 39 | 43810 | Triphenylmethane Chrome Violet Cg |
| New Fuchsin | 4252 | New Fuchsin |
| Night Blue | 44085 | Night Blue |
| Pararosanilin | 42500 | Pararosanilin |
| Primula | 42530 | Hoffman's Violet |
| Rosanilin | 42510 | Rosanilin |
| Solochrome Cyanin R | 43820 | Eriochrome Cyanin R |
| Victoria Blue 4r | 42563 | Victoria Blue 4r |
| Victoria Blue B | 44045 | Victoria Blue B |
| Victoria Green B | 42000 | Malachite Green |
| Water Blue I | 42755 | Water Blue I |

[1]See, R. D. Lillie, Conn's Biological Stains (8th ed., 1969), Williams and Wilkins Company, Baltimore, Maryland; Susan Budavari (Ed.), The Merck Index, (12th ed., 1996), Merck & Co., Whitehouse Station, N.J; see also, P. A. Lewis (Ed.), Pigment Handbook Vol. I, Properties and Economics, sections I(D)f(1) and I(D)g, John Wiley & Sons, (2nd ed., 1988); H. Zollinger, Color Chemistry: Syntheses, Properties, and Applications of Organic Dyes And Pigments, Chapter 4, VCH Publishers (1987); D. R. Waring and G. Hallas (Eds.), The Chemistry and Application of Dyes, Chapter 2, Section IX, Plenum Press (1990); and M. Okawara, T. Kitao, T. Hirashima, and M. Matsuoka, Organic Colorants: A Handbook of Data of Selected Dyes for Electro-Optical Applications, Section VI, Elsevier (1988), the disclosures of which are hereby incorporated by reference.

Another type of dye that can be used in an ink are the methine class of dyes. The methine dyes generally contain one or more methine group chromophores (—CH=), also called methylidyne or methine group. When the methine dye only contains one methine group the dye is sometimes referred to as a cyanine dye, with three methine groups the dye is sometime referred to as a carbocyanine dye, and with more than three methine groups the dye is often referred to as a polymethine dye. An example of a methine dye is Thiazole Orange:

wherein the bonds that make up the methine group are shown above as broken lines.: Other examples of methine dyes include Basic Red 15, Basic Yellow 11, and Basic Yellow 13. For a comprehensive listing of methine dyes, see F. M. Hamer, The Chemistry of Heterocyclic Compounds, A. Weissberger (Ed.), The Cyanine Dyes and Related Compounds, Wiley Interscience, New York (1964).

When formulating a highlightable ink of a particular color, whether by the addition of one eradicable dye or a mixture of eradicable dyes and a pigment, the rate of eradication of a dye is a consideration when selecting an eradicable dye. Without intending to be limited to a particular mechanism, it is believed that the rate of eradication of diarylmethane, triarylmethane, and methine dyes is proportional to the concentration of the dye in the mixture (e.g., ink or marking made with a mixture). The highlightable ink described herein includes one or more eradicable dyes selected from the group consisting of diarylmethane dyes, triarylmethane dye, methine dyes, and combinations thereof. In a marking composition, the dye preferably is present in an amount at least about 0.01% and up to about 40% by weight based on the total weight of the composition, more preferably about 0.1% to about 10% by weight, for example up to about 1% by weight or about 1.5% by weight.

In selecting particular dyes and colored pigments for use in the ink, there are a number of dyes and pigments to choose from and, as a result, dyes and pigments of different colors can be mixed to create an ink of almost any color. A highlightable ink described herein can include one or more dyes and one or more pigments that, when combined, provide an ink from of a variety of colors. In one embodiment, the dye and pigment are combined to provide an ink that is black in color in the non-eradicated state and is red in color in the eradicated (highlighted) state. There are at least two competing considerations when formulating an ink that includes at least one eradicable dye—the rate of eradication and the intensity of the color. An increase in the concentration of the eradicable dye used to create the green color will increase the intensity of the color, however, as discussed above, an increase in the dye concentration also increases the amount of time needed to eradicate the dye. It has been found that for the ink described herein a dye concentration in an amount at least about 0.1% and up to, about 40% by weight based on the total weight of the composition is a preferred concentration to balance these considerations.

The ink disclosed herein is can be used on porous or non-porous substrates. Nonlimiting examples of non-porous substrates include glass, ceramics, porcelain, plastics, metal, glossy paper and other non-porous paper such as cardboard or other hardboard material. We have found that the use of a substantially non-soluble pigment in combination with an eradicable dye prevents smearing of the ink upon eradication. Without intending to be limited to a particular mechanism for smear reduction, it is believed that when the substantially insoluble pigment is applied to a porous substrate such as paper, the pigment is not re-dissolved by the eradicator (e.g., aqueous eradicator) and is further prevented from smearing by being disposed in the pores of the substrate and thereby less influenced by the eradicator solution. Alternatively, a similar effect can be achieved with the use of a binder that binds a colorant (e.g., a pigment) to the substrate and, thereby, allows the colorant to be less influenced by the eradication solution. A preferred ink includes one or more colored pigments, and one or more eradicable dyes.

The process of highlighting with an ink begins with the eradication of the eradicable dye(s) in the ink mixture with an eradicator. The colored pigment, however, is substantially unaffected by the eradicator and continues to contribute to the color of the ink. A highlightable ink described herein will have two different colored states. The first state can be described as the non-eradicated state, wherein the ink (or at least a portion of a marking made with the ink) has not come in contact with an eradicator. A second state of color can be described as the eradicated (highlighted) state, wherein the ink (or at least a portion of a marking made with the ink) has come in contact with the an eradicator and the ink has made a change in color, preferably sufficient to be perceptible to the human eye. Once the dye is eradicated (the ink is in the eradicated state), the color of the ink preferably is primarily determined by the color contributed by the colored pigments in the ink mixture. It is preferred that the color contributed by the color pigments is different from the color of the ink in its non-eradicated state, to achieve a drastic highlighting effect.

Preferably, the color of the ink in its non-eradicated state is black, and the color of the ink in the eradicated state is either red, green, or blue.

Pigments for use in the ink described herein cover a wide variety of colors and types, including organic, inorganic, natural, and synthetic pigments. Preferred pigments are substantially insoluble in an aqueous medium and are particulate material that is dispersed in the ink solution. Typically, pigments are chemically inert, non-toxic, and stable to heat and light. A non-exhaustive list of pigment for use in inks described herein are listed below in Table II.

TABLE II

| Pigment Common/Commercial Name | Manufacturer | Color Index Hue |
|---|---|---|
| Permanent Yellow DHG | Hoechst (Frankfurt, Germany) | Yellow 12 |
| Permanent Yellow GR | Hoechst (Frankfurt, Germany) | Yellow 13 |
| Permanent Yellow G | Hoechst (Frankfurt, Germany) | Yellow 14 |
| Permanent Yellow NCG-71 | Hoechst (Frankfurt, Germany) | Yellow 16 |
| Permanent Yellow GG | Hoechst (Frankfurt, Germany) | Yellow 17 |
| Hansa Yellow RA | Hoechst (Frankfurt, Germany) | Yellow 73 |
| Hansa Brilliant Yellow 5GX-02 | Hoechst (Frankfurt, Germany) | Yellow 74 |
| DALAMAR Yellow YT-858-D | Heubach (Langelsheim, Germany) | Yellow 74 |
| Hansa Yellow X | Hoechst (Frankfurt, Germany) | Yellow 75 |
| NOVOPERM Yellow HR | Hoechst (Frankfurt, Germany) | Yellow 83 |
| CHROMOPHTAL Yellow 3G | Ciba-Geigy (Basle, Switzerland) | Yellow 93 |
| CHROMOPHTAL Yellow GR | Ciba-Geigy (Basle, Switzerland) | Yellow 95 |
| NOVOPERM Yellow FGL | Hoechst (Frankfurt, Germany) | Yellow 97 |
| Hansa Brilliant Yellow 10GX | Hoechst (Frankfurt, Germany) | Yellow 98 |
| Permanent Yellow G3R-01 | Hoechst (Frankfurt, Germany) | Yellow 114 |
| CHROMOPHTAL Yellow 8G | Ciba-Geigy (Basle, Switzerland) | Yellow 128 |
| IRGAZIN Yellow 5GT | Ciba-Geigy (Basle, Switzerland) | Yellow 129 |
| HOSTAPERM Yellow H4G | Hoechst (Frankfurt, Germany) | Yellow 151 |
| HOSTAPERM Yellow H3G | Hoechst (Frankfurt, Germany) | Yellow 154 |
| L74-1357 Yellow | Sun Chemical (Cincinnati, Ohio) | |
| L75-1331 Yellow | Sun Chemical (Cincinnati, Ohio) | |
| L75-2377 Yellow | Sun Chemical (Cincinnati, Ohio) | |
| HOSTAPERM Orange GR | Hoechst (Frankfurt, Germany) | Orange 43 |
| PALIOGEN Orange | BASF (Mount Olive, New Jersey) | Orange 51 |
| IRGALITE Rubine 4BL | Ciba-Geigy (Basle, Switzerland) | Red 57:1 |
| QUINDO Magenta | Mobay Chemical (Haledon, New Jersey) | Red 122 |
| INDOFAST Brilliant Scarlet | Mobay Chemical (Haledon, New Jersey) | Red 123 |
| HOSTAPERM Scarlet GO | Hoechst (Frankfurt, Germany) | Red 168 |
| Permanent Rubine F6B | Hoechst (Frankfurt, Germany) | Red 184 |
| MONASTRAL Magenta | Ciba-Geigy (Basle, Switzerland) | Red 202 |
| MONASTRAL Scarlet | Ciba-Geigy (Basle, Switzerland) | Red 207 |

TABLE II-continued

| Pigment Common/Commercial Name | Manufacturer | Color Index Hue |
|---|---|---|
| HELIOGEN Blue L 6901F | BASF (Mount Olive, New Jersey) | Blue 15:2 |
| HELIOGEN Blue NBD 7010 | BASF (Mount Olive, New Jersey) | |
| HELIOGEN Blue K 7090 | BASF (Mount Olive, New Jersey) | Blue 15:3 |
| HELIOGEN Blue L 7101F | BASF (Mount Olive, New Jersey) | Blue 15:4 |
| PALIOGEN Blue L 6470 | BASF (Mount Olive, New Jersey) | Blue 60 |
| HEUCOPHTHAL Blue G, XBT-583D | Heubach (Langelsheim, Germany) | Blue 15:3 |
| HELIOGEN Green K 8683 | BASF (Mount Olive, New Jersey) | Green 7 |
| HELIOGEN Green L 9140 | BASF (Mount Olive, New Jersey) | Green 36 |
| MONASTRAL Violet R | Ciba-Geigy (Basle, Switzerland) | Violet 19 |
| MONASTRAL Red B | Ciba-Geigy (Basle, Switzerland) | Violet 19 |
| QUINDO Red R6700 | Mobay Chemical (Haledon, New Jersey) | |
| QUINDO Red R6713 | Mobay Chemical (Haledon, New Jersey) | |
| INDOFAST Violet | Mobay Chemical (Haledon, New Jersey) | Violet 23 |
| MONASTRAL Violet Maroon B | Ciba-Geigy (Basle, Switzerland) | Violet 42 |
| RAVEN 1170 | Columbian Chemicals (Marietta, Georgia) | Black 7 |
| Special Black 4A | Degussa (Parsippany, New Jersey) | Black 7 |
| STERLING NS Black | Eastech Chemical, Inc. (Philadelphia, Pennsylvania) | Black 7 |
| STERLING NSX 76 | Eastech Chemical, Inc. (Philadelphia, Pennsylvania) | Black 7 |
| TIPURE R-101 | Du Pont, (Wilmington, Delaware) | |
| Mogul L | Eastech Chemical, Inc. (Philadelphia, Pennsylvania) | Black 7 |

To prepare an ink of a particular color, the amount of colored pigment used in an ink can be balanced with the amount of dye present in the ink to produce the desired color of the ink in its non-eradicated state. Also, when a large amount of colored pigment is used, depending on the substrate, the pigment may over saturate the substrate once the solvent (e.g., water) has evaporated. If over-saturation occurs, the application of the eradicator fluid to the marking can cause smearing of the pigment on the surface of the substrate. Thus, the ink preferably contains an effective amount to prevent smearing upon application of the eradicator solution, when the smearing effect is not desired. The colored pigment preferably is present in an amount at least about 0.01% and up to about 50% by weight based on the total weight of the composition, more preferably at least about 0.1% and up to about 20% by weight, for example up to about 3.5%, 7%, or 10% by weight.

The color of the ink will primarily be determined by the combination of an eradicable dye and a colored pigment which causes the ink to reflect a particular wavelength of visible light. The mixture of a dye and pigment of different colors can form an ink mixture in a wide variety of colors. The color selection can be done with the use varying amounts of two or more complementary colors, or combinations that contain all three primary colors (red, yellow, and blue). When two complementary colors are mixed, the resultant mixture is gray, with black being the completely saturated form of gray. The complement color of red is green, the complement color of orange is blue, and the complement color of yellow is violet. When using complementary colors, these pairs of complementary colors actually reflect all three primary colors. For example, when red and green dyes are mixed as complementary colors, it is the equivalent of mixing red with yellow and blue, because green is composed of a mixture of the two primary colors yellow and blue. In another example, the mixture of the two complementary colors yellow and violet is the equivalent of mixing yellow with red and blue, because violet is composed of two primary colors, red and blue.

An ink described herein can optionally include a binder resin to impart smear and water resistance to the ink. Binder resins for use in the ink preferably include glycols such as polyethylene glycol, polyvinylpyrrolidone and copolymers and salts thereof, polyvinylacetate and copolymers and salts thereof, and polyacrylic acids and copolymers and salts thereof, other film-forming, water-soluble resins, and combinations thereof. The binder resin preferably is selected from PVP and copolymers thereof, PVA and copolymers thereof, and combinations of the foregoing. More preferably, the binder resin is selected from PVP, copolymers thereof, and combinations of the foregoing.

The binder resin can also be used to control the viscosity of the ink. When a highly viscous ink is desired (e.g., cP>10,000), the use of a larger amount a binder resin will achieve a highly viscous ink. When the binder resin used is a polymer (e.g., PVP), the resin can be selected with a wide range of viscosities and molecular weights. For example, PVP is commercially, available at various viscosities, and in a molecular weight range of 10,000 daltons to 1,300,000 daltons (Aldrich Chemical Co., Inc., Milwaukee, Wis.) for example. Thus, depending on the molecular weight of the polymer resin, there can be a great deal of variation in the amount of resin utilized in the, ink, and the overall viscosity of the ink. When, for example, a low molecular weight PVP is used, the ink can achieve smear and water resistance while still maintaining a low viscosity,(e.g., about 2 cP to about 5 cP). A binder resin used herein preferably is present in an amount in a range of about 1 wt. % to about 80 wt. % based on the total weight of the composition, more preferably about 5 wt. % to about 20 wt. %.

The ink preferably is water-based (aqueous). Water preferably is present in an amount in a range of about 50% to about 95% by weight based on the total weight of the composition, more preferably about 60% to about 80% by weight. The water acts to dissolve the dye component and as a medium in which to suspend the colored pigment and also provides an improved washability of the ink from various materials (e.g., clothes) as compared to oil-based inks.

When an aqueous ink is used in a delivery system such as a writing instrument or an ink-jet cartridge, is it preferred to use one or more organic solvents to control the amount of time it takes for the ink to dry once it is applied to a substrate (drying time). Preferred delivery systems include a writing instrument, an ink-jet cartridge, and commercial ink-jet imaging applications. As compared to water, organic solvents will typically evaporate faster than water, and when an aqueous ink includes an organic solvent, the drying time will decrease. In order to optimize and exercise control over the drying time of an ink, it may be necessary to include more than one organic solvent. An organic solvent preferably is substantially soluble in water. Preferably, the organic solvent is selected from the group consisting of glycols, ureas, fatty alcohols, dimethylformamide, formamide, dimethylsulfoxide, high molecularweight hydrocarbons (i.e., a hydrocarbon with twelve or more. carbon atoms), low molecular weight hydrocarbons (i.e., a hydrocarbon with eleven or, fewer carbon atoms), and combinations thereof. More preferably, the organic solvent is polyethylene glycol. The organic solvent, when used, preferably is present in the ink at least about 5% and up to about 30% by weight based on the total weight of the composition, more preferably at least about 10% and up to about 20% by weight, to achieved a drying time suitable for typical writing instruments and marking applications.

Glycols for use as an organic solvent include, but are not limited to, three broad categories of glycols: (a) glycol ethers (e.g., ethylene glycol monomethyl ether, ethylene glycol monoethyl ether, ethylene glycol moniobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether, ethylene glycol dimethyl ether, ethylene glycol diethyl ether, diethylene glycol dimethyl ether, propylene glycol monomethyl ether); (b) glycol ether acetates (e.g., ethylene glycol monomethyl ether acetate, ethylene glycol monoethyl ether acetate, ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate, propylene glycol monomethyl ether acetate, and the like); and (c) glycol acetates (e.g., ethylene glycol monoacetate, ethylene glycol diacetate, and diethylene glycol diacetate). In other embodiments, the ink can include other glycols not within one of these three categories, including glycols such as ethylene glycol, and ethoxylated glycols. A glycol can be used in the ink composition preferably in an amount in the range of about 10% to about 20% by weight based on the total weight of the mixture.

Fatty alcohols for use as an organic solvent include, but are not limited to, alcohols having eight through twenty carbon atoms, and fatty alcohols that are ethoxylated with one to three molar equivalents of ethylene oxide. Examples of fatty alcohols and ethoxylated fatty alcohols include, but are not limited to, behenyl alcohol, caprylic alcohol, cetyl alcohool, cetaryl alcohol, decylalcohol, lauryl alcohol, isocetyl alcohol, myristyl alcohol, oleyl alcohol, stearyl alcohol, tallow alcohol, steareth-2, ceteth-1, cetearth-3, and laureth-2. Additional suitable fatty alcohols are listed in CTFA Cosmetic Ingredient Handbook, First ed., J. Nikotakis (Ed.), The Cosmetic, Toiletry and Fragrance Association, pages 28 and 45 (1988), incorporated herein by reference.

An organic solvent can be selected to decrease or increase the drying time or cap-off time of an ink described herein (e.g., when the mixture is disposed in a writing instrument or ink-jet application). Without intending to be limited to a particular mechanism of altering the drying time, it is believed that the volatility of an organic solvent added to the ink contributes to the volatility of the ink mixture such that the organic solvent either increases or decreases the volatility of the ink, and thereby increases or decreases the drying time (i.e., when the mixture is applied to a substrate) and/or the cap-off time (i.e., when the mixture is disposed in a delivery device such as a writing instrument). Thus, a volatile organic solvent is preferably selected to decrease the drying time and/or increase the cap-off time of the mixture. Preferably, a volatile organic solvent is selected from the group consisting of acetone, methyl ethyl ketone, methanol, ethanol, isopropanol, and combinations thereof.

For a liquid to effectively wet and spread out on a surface (e.g., paper), the surface tension of the liquid must be less than the surface tension of the surface. An organic solvent can also be selected to alter the surface tension of the mixture to create a mixture that has enough surface tension to wet a variety of surfaces. The mixture preferably includes a glycol to alter the surface tension of the mixture, more preferably polyethylene glycol.

In the ink described herein, the color green can be achieved by the mixing of the combination of dyes and pigments of either two complementary colors (e.g., green-red, or yellow-magenta) or by dyes/pigments with the combination of all three primary colors (red, yellow, and blue). A dark green ink is preferably formed from the combination of a green dye with a pigment selected from the group consisting of a red pigment, a violet pigment, and combinations thereof. A preferred combination is a green dye and red pigment, and the preferred combination is Basic Green 4 and a red pigment or a combination of pigments that combine to form a red pigment-dispersion. The preferred red pigment dispersion is LUCONYL 3855 available from BASF of Charlotte, N.C.

When combining two or more colors to form an ink of a desired color, it is understood that the desired color (e.g., black), may be reached even though an undertone of another color (e.g., a redish color) might be perceptible. For example, it is understood that an ink that is colored black can have a red or a green undertone, and yet still be considered a black ink.

It has been found that the combination of a green eradicable dye and a violet and/or a red dye is able to mix to form a green highlightable ink. One embodiment of an ink described herein is a green highlightable ink, including a mixture of one or more of a colored pigment and one or more dyes selected from the group consisting of diarylmethane derivatives, triarylmethane derivatives, methine dyes, and combinations thereof, wherein the mixture of dye and pigment appears green in color.

A green eradicable dye preferably is selected from the group consisting of Acid Green, Acid Green 5, Basic Green 4, Diamond Green B, Ethyl Green, Fast Green Fcf, Food Green 3, Light Green, Lissamine Green Sf, Malachite Green, Methyl Green, Victoria Green B, and combinations thereof, more preferably, the green dye is selected from Basic Green 3, Basic Green 4, and combinations thereof. Preferably, a red dye is selected from the group consisting of Basic Red 9, Basic Red 14, Basic Red 15, Basic Red 29, Basic Red 46, and combinations thereof. Preferably, a violet dye is selected from the group consisting of Acid Violet 17, Acid Violet 19, Basic Violet 2, Basic Violet 3, Basic Violet 4, Basic Violet 14, Chrome Violet Cg, Crystal Violet, Ethyl Violet, Gentian Violet, Hoffmnan's Violet, Methyl Violet, Methyl Violet 2b, Methyl Violet 10b, Mordant Violet 39, and combinations thereof. To form a yellow ink, a yellow dye is preferably selected from the group consisting of Basic Yellow 11, Basic Yellow 13, Basic Yellow 21, Basic Yellow 28, Basic Yellow 29, Basic Yellow 40, Basic Yellow 291, and combinations thereof.

Preferably a mixture described herein is black in color. It has been found, quite surprisingly, that the addition of one or more non-eradicable dyes to the mixture including a pigment and an eradicable dye improves the richness of the black color in a black highlightable composition and improves the contrast between the non-highlighted mixture and the highlighted mixture. Accordingly, one embodiment of a mixture described herein is an aqueous mixture including water, a colored pigment, a non-eradicable dye, and an eradicable dye selected from the group consisting of diarylmethane derivatives, triarylmethane derivatives, methine dyes, and combinations thereof.

It has been found that the addition of a blue, red, violet, yellow, and/or orange non-eradicable dye improves the richness of the black color in a black mixture described herein. Thus, in one embodiment a non-eradicable dye is present in a mixture described herein and is preferably selected from blue non-eradicable dyes, red non-eradicable dyes, violet non-eradicable dyes, yellow non-eradicable dyes, orange non-eradicable dyes, and combinations of the foregoing. Preferably, a blue non-eradicable dye is selected from the group consisting of Acid Blue 1, Acid Blue 104, Acid Blue 182, Acid Blue 204, Acid Blue 74, Acid Blue 9, Acid Blue 90, Basic Blue 1, Basic Blue 7, Basic Blue 9, Basic Blue 33, Direct Blue 199, Direct Blue 281, Disperse Blue 73, Reactive Blue 19, Reactive Blue 21, and combinations thereof. Preferably, a red non-eradicable dye is selected from the group consisting of Acid Red 18, Acid Red 249, Acid Red 52, Acid Red 87, Acid Red 92, Basic Red 22, Basic Red 28, Basic Red 46, Direct Red 236, Direct Red 252, and combinations thereof. Preferably, a violet non-eradicable dye is selected from the group consisting of Acid Violet 12, Acid Violet 126, Acid Violet 17, Acid Violet 49, Basic Violet 1, Basic Violet 10, Basic Violet 3, and combinations thereof. Preferably, a yellow non-eradicable dye is selected from the group consisting of Acid Yellow 17, Acid Yellow 118, Acid Yellow 23, Acid Yellow 3, Acid Yellow 32, Acid Yellow 36, Basic Yellow 21, Basic Yellow 28, Basic Yellow 37, Basic Yellow 40, Basic Yellow 291, and combinations thereof. Preferably, an orange non-eradicable dye is selected from the group consisting of Acid Orange 10 Reactive Orange 16; and combinations thereof.

Also contemplated is a method of highlighting including the steps of affixing a mixture described herein in or on a substrate to make a mark (e.g., applying), and applying an eradicator fluid to at least a portion of the mark. Preferably, the substrate is paper, and preferably the eradicator fluid is selected from the group consisting of a sulfite, a bisulfite, and combinations thereof.

Also contemplated is a kit that includes a highlightable mixture described herein together with an eradicator fluid, for use in system of marking a substrate and eradicating the marking. Each of the mixture and the eradicator fluid can be disposed in a writing instrument (e.g., a pen) for ease of use or it may be supplied in another form such as a dauber, a bottled free ink solution, a stamp pad, and the like. Preferably, a mixture described herein is disposed in a writing instrument and the writing instrument is, for example, a ball-point pen, an extruded plastic porous tip pen, or a marker.

After a highlightable ink mixture described herein is applied to a substrate, the solvent(s) present in the mixture (e.g., water) will at least substantially evaporate. Likewise, the solvent(s) present in the eradicator fluid (e.g., water) will at least substantially evaporate once the eradicator has been applied to the mixture, leaving the eradication agent (e.g., sulfite, bisulfite) along with the mixture components (e.g., eradicated dye, non-eradicated dye, colored pigment). Thus, another aspect of the invention is a colored complex of the mixture described herein with an eradicator fluid after the solvents have substantially or completely evaporated. The highlighted complex includes a colorless or substantially colorless dye selected from the group consisting of diarylmethane derivatives, triarylmethane derivatives, methine dyes, and combinations thereof, a colored pigment, a non-eradicable dye, and any optional additives described herein.

In other useful embodiments, the agents and/or mixtures described herein may be combined in the presence of a solvent under conditions in which the solvent does not evaporate.

The highlighting or color-changing effect of a mixture described herein in best achieved when the color of the pigment present in the mixture is substantially unaffected by an eradication solution. Where the color of the pigment is substantially unaffected by the eradication solution, the color of the pigment contributes to the overall color of the complex created by the mixture of eradicated dye, non-eradicated dye, pigment, and eradication solution that is created when the eradication solution is applied to the mixture. Thus, preferably the color of the colored pigment present in a mixture described herein is substantially unaffected by one or more of a reducing agent, an oxidizing agent, and a change in pH (e.g., pH of the mixture or of a mixture resulting from combination of a marking made with the pigment and an eradicator solution.

A mixture described herein can be used as an ink to make markings on a variety of substrates (e.g., paper). In an ink, a surfactant can be used to improve the, absorption of an ink by a substrate (e.g, paper), and a film-forming agent can be used to improve the adhesion of the resulting mark to the substrate. Thus, the mixture described herein can include one or more additives selected from the group consisting, of pH buffers, surfactants, biocides, anti-corrosive agents, sequestering agents, anti-crusting agents, rehology control agents, binder resins, film-forming agents, and combinations thereof, in the amounts and proportions conventionally used in inks for various applications.

A mixture described herein can be used in a delivery system such as in an ink-jet application. The mixture can be used in a home-office ink-jet system (e.g., a HEWLETT-PACKARD ink-jet printer cartridge), and in commercial and industrial ink-jet applications. Ink-jet printers for use with a mixture described herein include those that use the continuous inkjet printer technology, which deflects and controls a continuous inkjet droplet stream direction onto the printed media or into a gutter for recirculation by applying an electric field to previously charged inkjet droplets, and those that use the drop-on-demand inkjet technology (e.g., piezoelectric and thermal ink-jet printhead) which ejects ink droplets only when they are needed to print on the media. Preferred delivery systems include the piezoelectric ink-jet printheads and thermal inkjet printheads.

A mixture described herein can be used in a number of applications, including those that do not involve the application of the mixture onto a substrate (e.g., as an ink). Thus, a Mixture described herein can be used with or without a substrate serving as a situs of the highlighting or color-changing effect. For example, the mixture described herein could be used in an application wherein the mixture and an eradication solution mix in the liquid phase, to create a color change to the mixture when the eradication solution contacts the mixture. In another example, the aqueous mixture described herein can be combined in the, liquid phase with an non-aqueous eradicator solution that creates a biphasic mixture wherein the highlighting or color-changing effect of the mixture occurs at the biphasic interface of the two solutions.

EXAMPLES

The following examples are provided to illustrate the invention but is not intended to limit the scope of the invention.

Example 1

A highlightable ink was prepared with the ingredients identified below in the amounts shown in Table III:

TABLE III

| Component | Function | Amount (wt. %) |
| --- | --- | --- |
| Water | Solvent | 76.48 |
| Propylene Glycol | Organic Solvent | 19.12 |
| Basic Green 4 | Dye | 0.96 |
| LUCONYL 3855 | Pigment | 3.44 |

The propylene glycol (available from EM Science of Gibbstown, N.J.), was added at room temperature to the water and mixed until a homogenous, particulate-free solution was formed. The Basic Green 4 dye was then added to this solution and the solution was mixed until the dye were fully dissolved. The pigment was then added and the solution was mixed for an hour until a homogenous solution was formed.

The resulting ink was then put into a SHARPIE marker and applied to a sheet of white paper to determine the color of the ink once applied to the substrate. The ink was observed to be a dark green color.

As described above, it is believed that the major contributing factor to the length of time it takes to highlight an ink described herein is proportional to the weight percent of eradicable dye present in the ink. Thus, after the ink was applied to a white sheet of paper, the eradication time was tested with a commercially available eradicator solution available from Sanford Reynolds of Valence, France. Upon the application of the eradication solution to the marking, the marking changed in color from a dark green to a red, and this conversion took approximately five seconds.

Example 2

Two highlightable ink mixtures were prepared with the ingredients identified below in the amounts shown in Table IV:

TABLE IV

| Component | Function | Amount (wt. %) Formulation 1 | Amount (wt. %) Formulation 2 |
| --- | --- | --- | --- |
| Deionized Water | Solvent | 66.15 | 64.1 |
| Propylene Glycol | Organic Solvent | 20.00 | 20.00 |
| SPECTRAZINE Yellow GRL 200% | Non-Eradicable Dye | 0.35 | 0.50 |
| SPECTRAZINE Brilliant Blue | Non-Eradicable Dye | | 3.00 |
| SPECTRA Soluble Blue 2B EX | Eradicable Dye | | 1.50 |
| SPECTRACID Black | Eradicable Dye | 6.00 | |
| HOSTAFINE RED HF3S | Pigment | 7.50 | |
| HOSTAFINE GREEN GN | Pigment | | 10.00 |
| Sodium Acetate | Salt | | 0.90 |

The propylene glycol (available from EM Science of Gibbstown, N.J.), was added at room temperature to the water and mixed until a homogenous, particulate-free solution was formed. The eradicable dyes (SPECTRACID Black (available from Spectra Colors Corporation, Kearny, N.J.) to Formulation 1 and SPECTRA Soluble Blue 2B EX (available from Spectra Colors Corporation, Kearny, N.J.) to Formulation 2) and non-eradicable dyes (SPECTRAZINE Yellow GRL 200%, Colour Index No. Basic Yellow 291 (available from Spectra Colors Corporation, Kearny, N.J.) to Formulations 1 and 2, and SPECTRAZINE Bril. Blue, Colour Index No. Basic Blue 1 (available from Spectra Colors Corporation, Kearny, N.J.) to Formulation 2) were then added to this solution and the solution was mixed until the dyes were fully dissolved. The pigments (HOSTAFINE RED HF3S, Colour Index No. Pigment Red 188 (available from Clariant Corporation, Coventry, R.I.) to Formulation 1 and HOSTAFINE GREEN GN, Colour Index No. Pigment Green 7 (available from Clariant Corporation, Coventry, R.I.) to Formulation 2) were then added and the solution was mixed for an hour until a homogenous solution was formed.

The resulting inks were then put into SHARPIE markers and applied to a sheet of white paper to determine the color of the ink once applied to the substrate. The markings resulting from the application of formulations 1 and 2 were observed as a rich black in color. The resulting markings on white paper where then treated with a commercially available eradicator solution available from Sanford Reynolds of Valence, France. The markings made with Formulation 1 changed color from black to red, and the marking made with Formulation 2 changed color from black to green. The eradication of the markings made with both formulations 1 and 2 did not result in smearing of the marking and only the marking made with the ink (e.g., words written,: on paper) changed color (i.e., showed a highlighting effect).

The foregoing description is given for clearness of understanding only, and no unnecessary limitations should be understood therefrom, as modifications within the scope of the invention may be apparent to those having ordinary skill in the art. Throughout the specification, where compositions are described as including components or materials, it is contemplated that the compositions can also consist essentially of, or consist of, any combination of the recited components or materials, unless stated otherwise.

What is claimed is:

1. A mixture, comprising water, a colored pigment, a non-eradicable dye, and an eradicable dye selected from the group consisting of diarylmethane derivatives, triarylmethane derivatives, methine dyes, and combinations thereof.

2. The mixture of claim 1, wherein the color of said colored pigment is substantially unaffected by a reducing agent.

3. The mixture of claim 2, wherein said reducing agent comprises a compound selected from the group consisting of a sulfite reducing agent, a bisulfite reducing agent, and combinations thereof.

4. The mixture of claim 1, wherein said mixture is black.

5. The mixture of claim 1, wherein said eradicable dye is selected from the group consisting of Basic Yellow 2, Basic Yellow 11, Basic Yellow 13, Basic Yellow 21, Basic Yellow 28, Basic Yellow 29, Basic Yellow 40, Acid Blue 22, Acid Blue 93, Acid Greens, Acid Violet 17, Acid Violet 19, Basic Blue 8, Basic Blue 15, Basic Blue 20, Basic Blue 26, Basic Green 4, Basic Red 9, Basic Red 14, Basic Red 15, Basic Red 29, Basic Red 46, Basic Violet 2, Basic Violet 3, Basic Violet 4, Basic Violet 14, Food Green 3, and combinations thereof.

6. The mixture of claim 1, wherein said eradicable dye is present in an amount at least about 0.01% and up to about 40% by weight based on the total weight of the mixture.

7. The mixture of claim 6, wherein said eradicable dye is present in an amount at least about 0.1% and up to about 10% by weight based on the total weight of the mixture.

8. The mixture of claim 1, wherein said colored pigment is present in an amount at least about 0.01% and up to about 50% by weight based on the total weight of the mixture.

9. The mixture of claim 8, wherein said colored pigment is present in an amount at least about 0.1% and up to about 20% by weight based on the total weight of the mixture.

10. The mixture of claim 1, wherein said non-eradicable dye is selected from the group consisting of non-eradicable blue dyes, non-eradicable red dyes, non-eradicable violet dyes, non-eradicable yellow dyes, non-eradicable orange dyes, and combinations of the foregoing.

11. The mixture of claim 10, wherein said non-eradicable dye is selected from the group consisting of Acid Blue 1, Acid Blue 104, Acid Blue 182, Acid Blue 204, Acid Blue 74, Acid Blue 9, Acid Blue 90, Basic Blue 1, Basic Blue 7, Basic Blue 9, Basic Blue 33, Direct Blue 199, Direct Blue 281, Disperse Blue 73, Reactive Blue 19, Reactive Blue 21, Acid Red 18, Acid Red 249, Acid Red 52, Acid Red 87, Acid Red 92, Basic Red 22, Basic Red 28, Direct Red 236, Direct Red 252, Acid Violet 12, Acid Violet 126, Acid Violet 49, Basic Violet 1, Basic Violet 10, Acid Yellow 17, Acid Yellow 118, Acid Yellow 23, Acid Yellow 3, Acid Yellow 32, Acid Yellow 36, Basic Yellow 21, Basic Yellow 37, Basic Yellow 40, Basic Yellow 291, Acid Orange 10, Reactive Orange 16, and combinations thereof.

12. The mixture of claim 11, wherein said non-eradicable dye is selected from the group consisting of Basic Blue 1, Basic Yellow 291, and combinations thereof.

13. The mixture of claim 1, wherein the color of said colored pigment is substantially unaffected by an oxidizing agent.

14. The mixture of claim 1, wherein the color of said colored pigment is substantially unaffected by a change in pH.

15. The mixture of claim 1, further comprising a reducing agent.

16. The mixture of claim 1, further comprising an oxidizing agent.

17. The mixture of claim 1, further comprising a binder resin.

18. The mixture of claim 17, wherein said binder resin is selected from the group consisting of polyethylene glycol, polyvinylpyrrolidone and copolymers and salts thereof, polyvinylacetate and copolymers and salts thereof, polyacrylic acid and copolymers and salts thereof, and combinations of the foregoing.

19. The mixture of claim 1, further comprising an organic solvent.

20. The mixture of claim 19, wherein said organic solvent is selected from the group consisting of glycols, ureas, fatty alcohols, dimethylformamide, formamide, dimethylsulfoxide, high molecular weight hydrocarbons, low molecular weight hydrocarbons, and combinations thereof.

21. The mixture of claim 19, wherein said organic solvent is selected from the group consisting of acetone, methyl ethyl ketone, methanol, ethanol, isopropanol, and combinations thereof.

22. The mixture of claim 19, wherein said organic solvent is present in an amount at least about 5% and up to about 30% by weight based on the total weight of the mixture.

23. The mixture of claim 1, further comprising an additive selected from the group consisting of pH buffers, surfactants, biocides, anti-corrosive agents, sequestering agents, anti-crusting agents, rehology control agents, binder resins, film-forming agents, and combinations thereof.

24. A mixture, comprising water, a colored pigment in an amount at least about 0.01% and up to about 50% by weight based on the total weight of the mixture, a non-eradicable dye, an eradicable dye in an amount at least about 0.01% and up to about 40% by weight based on the total weight of the mixture, said eradicable dye selected from the group consisting of diarylmethane derivatives, triarylmethane derivatives, methine dyes, and combinations thereof, and a binder resin, wherein the color of said colored pigment is substantially unaffected by one or more of an oxidizing agent, a reducing agent, and a change in pH.

25. A marking instrument, comprising a writing instrument containing the mixture of claim 1.

26. A marking instrument, comprising an ink-jet cartridge containing the mixture of claim 1.

27. A marking instrument, comprising a continuous ink-jet printhead containing the mixture of claim 1.

28. A marking instrument, comprising a drop-on-demand ink-jet printhead containing the mixture of claim 1.

29. The instrument of claim 28, wherein said drop-on-demand ink-jet printhead comprises a printhead selected from the group consisting of a piezoelectric ink-jet printhead, and a thermal ink-jet printhead.

30. A method of highlighting, comprising the steps of contacting the mixture of claim 1 and a substrate to make a mark, and applying an eradicator fluid to at least a portion of said mark.

31. The method of claim 30, wherein said substrate is paper.

32. The method of claim 31, wherein said paper comprises non-porous paper.

33. The method of claim 30, wherein said eradicator fluid comprises a compound selected from the group consisting of a sulfite, a bisulfite, and combinations thereof.

34. A highlighting kit, comprising the mixture of claim 1 and an eradicator fluid.

35. The highlighting kit of claim 34, wherein said eradicator fluid comprises a reducing agent.

36. The highlighting kit of claim 35, wherein said reducing agent comprises a compound selected from the group consisting of a sulfite reducing agent, a bisulfite reducing agent, and combinations thereof.

37. The highlighting kit of claim 34, wherein said eradicator fluid comprises an oxidizing agent.

38. A highlighted complex, comprising a mixture of a colorless or substantially colorless eradicable dye selected from the group consisting of diarylmethane derivatives, triarylmethane derivatives, methine dyes, and combinations thereof, a non-eradicable dye, and a colored pigment.

* * * * *